Jan. 30, 1962  G. V. YOUNG  3,019,025
APPARATUS FOR SPREADING GRANULAR MATERIAL
USING HYDRAULIC POWER
Filed Jan. 12, 1959  2 Sheets-Sheet 1
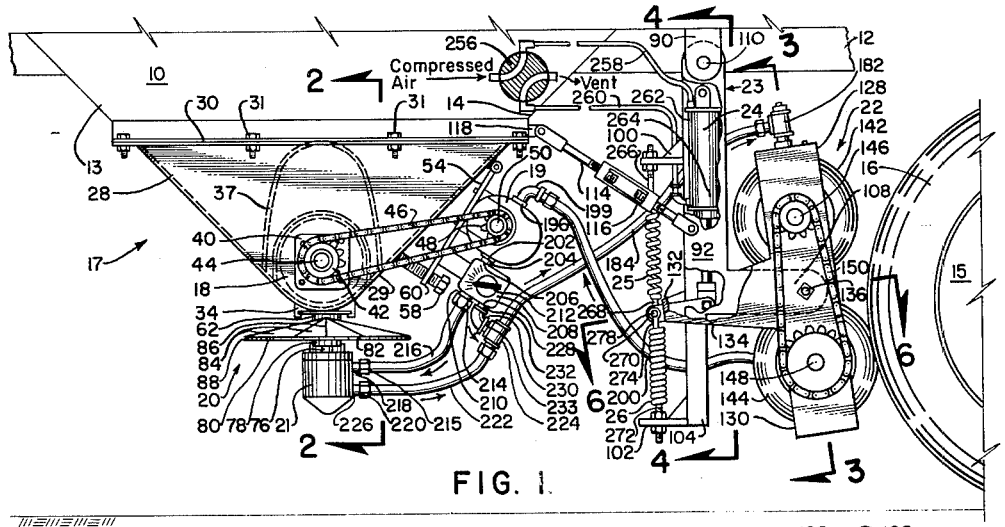
FIG. 1.
FIG. 2.  FIG. 7.
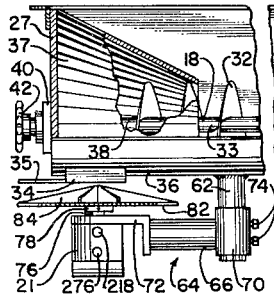
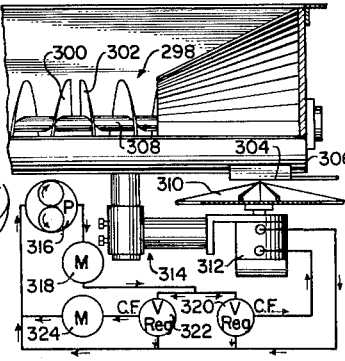
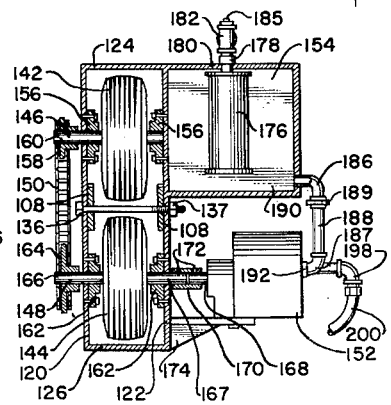
FIG. 3.
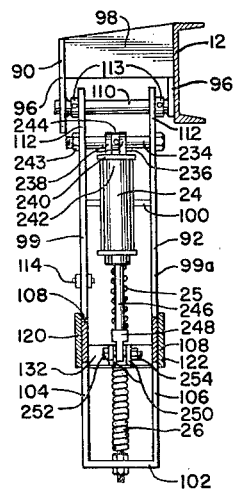
FIG. 4.  FIG. 5.  FIG. 6.
INVENTOR
GERALD V. YOUNG
By Edward E. Schilling
AGENT Jan. 30, 1962 G. V. YOUNG 3,019,025
APPARATUS FOR SPREADING GRANULAR MATERIAL
USING HYDRAULIC POWER
Filed Jan. 12, 1959 2 Sheets-Sheet 2

INVENTOR.
GERALD V. YOUNG
BY
Edward E. Schilling
AGENT

United States Patent Office 3,019,025
Patented Jan. 30, 1962

3,019,025
APPARATUS FOR SPREADING GRANULAR
MATERIAL USING HYDRAULIC POWER
Gerald V. Young, Gladwin, Mich., assignor to H. V.
Young Oil Company, Gladwin, Mich., a corporation of
Michigan
Filed Jan. 12, 1959, Ser. No. 786,269
13 Claims. (Cl. 275—8)

The invention relates to an improved apparatus for spreading granular material on highways and the like and more particularly concerns unloading and spreading apparatus and hydraulic power means therefor adapted for use with a wheeled truck or trailer having a hopper or other container for granular material.

One of the problems of all-weather maintenance of streets or highways is that of spreading granular materials, such as sand or calcium chloride, in a uniform and economical manner over long stretches of highway at a desired rate and across a desired lateral width of a surface. Some types of apparatus used heretofore, in conjunction with a truck or trailer, for spreading granular materials have suffered from the disadvantage that the lateral distance the material is thrown is inherently proportional to the speed of the vehicle. In other types of apparatus a supplemental gasoline engine has been used to drive a spinner-spreader at constant speed to achieve uniform lateral throw. However, the use of a supplemental engine has been rather unsatisfactory not only because of the inconvenience to the operator in having to get out of his truck cab to start and shut off the supplemental engine but also the outright difficulty of starting the supplemental engine under adverse weather conditions. Also the use of a supplemental gasoline engine necessitates provision for a separate fuel supply and ignition system for the said gasoline engine and the operator is faced with the additional problem of not knowing whether the gasoline engine is running nor at what speeds unless an adequate system of indicators is employed.

It is therefore an object of the present invention to provide an improved apparatus for distributing granular material from a wheeled vehicular container over a predetermined width of a surface and at a rate proportional to the speed of the vehicle.

Another object of the invention is to provide an improved apparatus for spreading granular material from a wheeled vehicular container over a predetermined width of a surface and at a rate proportional to the speed of the vehicle, which does not require a separate fuel and ignition system.

Another object of the invention is to provide an improved apparatus, for spreading granular material from a wheeled vehicular container over a predetermined width of a surface and at a rate proportional to the speed of the vehicle, which is adapted to be readily controlled remotely by the operator as from a truck cab.

An additional object of the invention is to provide an improved apparatus, for distributing granular material from a wheeled vehicular container over a predetermined width of a surface and at a rate proportional to the speed of the vehicle, which is adapted to be remotely controlled, as from the cab of a truck transporting or towing the vehicle, while the vehicle is in motion.

Another object of the invention is to provide an improved apparatus for distributing granular material from a wheeled vehicular container over a predetermined width of a surface and at a rate proportional to the speed of the vehicle, which is operated by hydraulic actuating means.

A further object of the invention is to provide an improved apparatus, for distributing granular material from a wheeled vehicular container over a predetermined width of a surface and at a rate proportional to the speed of the vehicle, which is adapted to be driven by hydraulic power derived from a wheel of the vehicle.

Still a further object of the invention is to provide an improved apparatus, for distributing granular material from a wheeled vehicular container over a predetermined width of a surface and at a rate proportional to the speed of the vehicle, which is adapted to permit the operator to select one of two predetermined spreading rates relative to the speed of the vehicle.

These and other objects have been attained by the present invention which comprises, in combination with a wheeled vehicular container, such as a V-bottom trailer, a screw feed device driven by a first hydraulic motor at a speed proportional to the linear speed of the trailer, a vaned spinner-spreader disposed below the hopper at the delivery end of the screw feed device and driven at a constant preselected speed by a specially controlled second hydraulic motor, and controllable power pick-up means for obtaining or deriving hydraulic power for the two hydraulic motors, the derived power being proportional to the speed of the vehicle when the vehicle is in motion. The means for deriving hydraulic power is conveniently adapted for operator control from the truck cab.

The nature of the present invention will be more fully understood upon becoming familiar with the following detailed description and claims, reference being had to the drawing.

FIG. 1 is a fragmentary side view of a V-bottom truck trailer having mounted thereon the apparatus of the invention. Some parts of the apparatus have been partly broken away for the purpose of better illustrating the spatial relationship of the parts. Some otherwise hidden parts have also been shown in dotted outline to illustrate relative positions.

FIG. 2 is a fragmentary view, partly in vertical section, taken along the line 2—2 of FIG. 1 showing the relationship of the apex portion of the hopper, the screw conveyor, and the vaned spinner-spreader and hydraulic motor therefor mounted therebelow.

FIG. 3 is a view, partly in section, taken along the line 3—3 of FIG. 1 showing the relationship of various parts of a means for deriving hydraulic power.

FIG. 4 is a view, partly in section, taken along the line 4—4 of FIG. 1 showing the relationship of the trailer chassis frame member, the parts of the cooperative supporting means and pivotal bracket of the said power deriving means, the power deriving means and the control means for moving the power deriving means in and out of operating position.

FIG. 5 is a slightly enlarged fragmentary view, partly in section, showing a coil spring and associated linking members of the type shown in FIG. 1 as part of the control means for the said power deriving means.

FIG. 6 is a view, partly in section, taken along the line 6—6 of FIG. 1, further illustrating the lower portion of the said power deriving means and the relationship of the supporting brackets thereof.

FIG. 7 is a fragmentary view, partly in section, taken along the line 2—2 of FIG. 1, and partly shown schematically, illustrating a combination of some of the parts in a different embodiment of the invention in which only the screw feed device and vaned spreading means and actuating means therefor differ from that shown in FIGS. 1 and 2.

In the several views of the drawing like numerals refer to like parts.

Figure 8:
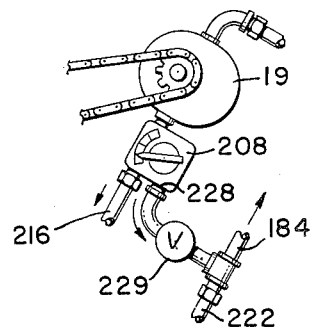
FIG. 8 is a fragmentary side view showing, as a subcombination of parts in a different embodiment of the invention, a relief valve, a flow regulator, actuating means for the screw conveyor, and associated pipe connections. The subcombination of parts is similar to that incorporated in the apparatus of FIG. 1, differing only in having a relief valve as a separate entity from the flow regulator.

In FIG. 1 is shown a fragmentary portion of a V-shaped hopper 10 mounted transversely on a truck trailer frame 12 and having forward sloping and rearward sloping walls 13, 14 inclined toward the front and rear ends of the trailer, respectively. For simplicity of illustration only fragmentary portions of the chassis frame member 12 and rear trailer wheel 15 and tire 16 are shown. Frame member 12, normally disposed horizontally, extends from the front to the rear of the trailer through the hopper 10. Shown attached to the hopper 10 and frame member 12 is a detachable apex portion of the hopper indicated generally by the numeral 17 with a screw conveyor 18 disposed therein, a first hydraulic motor 19 for driving the screw conveyor, a vaned spinner-spreader indicated generally by the numeral 20, a second hydraulic motor 21 for driving the spinner-spreader which is mounted below the delivery end of the screw conveyor 18. Power deriving means, indicated generally by the numeral 22, having a support assembly therefor indicated generally by the numeral 23, is shown depending from the frame member 12 adjacent the rear trailer wheel 15. The power deriving means 22, as will be described in detail later, is remotely controllable, by means of a double acting air cylinder 24 and coil spring means 25, 26 which oppose the action of the air cylinder, to a neutral inoperative position and to either of two operating positions producing differing levels of proportional power respectively.

Referring now to FIGS. 1 and 2, it may be seen that the detachable apex portion 17 of the hopper has vertical endwalls 27 and front and back sloping walls 28, 29 formed of heavy gauge steel. The apex portion 17 is attached to the main portion of the hopper 10 by flange assembly 30 held together by nut and bolt assemblies 31 or by other suitable means. Disposed in the lower part of the apex portion 17 along the bottom thereof and axially aligned therewith is a screw conveyor 18 comprising a spiral flight 32 attached about and along axial shaft 33. The spiral flight 32 terminates adjacent the gate opening 34 in the bottom 36 of apex portion 17. Gate opening 34 is provided with a sliding gate 35. A slightly flattened truncated cone-shaped metal shroud 37 welded to or mounted near the bottom 36 of apex portion 17 with one end abutted against an endwall 27 surrounds the end portion 38 of screw conveyor 18 and straddles adjacent gate opening 34. The shroud 37 serves as a baffle to prevent granular material from falling directly through the gate opening 34 when the gate slide 35 is moved to the open position. The screw conveyor shaft 33 extends through the vertical endwalls 27 and is journalled in flange bearings 40 or other suitable bearings, only one of the identical endwalls and bearing assemblies being shown. A drive wheel 42 in the form of a sprocket is mounted on the screw conveyor shaft 33 adjacent the end 44 thereof. The drive wheel 42 is driven by a flexible sprocket chain 46 connecting the said drive wheel 42 with a drive wheel 48 also in the form of a sprocket mounted on the shaft 50 of the hydraulic motor 19. The hydraulic motor 19 is mounted on a hinged plate support member 54 attached to the back wall 29 of the apex portion 17 of the hopper 10. The tension of the sprocket chain 46 is regulated by suitably adjusting a bolt 58 threadably inserted in and extending through the plate support member 54 so as to urge the free end 60 thereof away from the backwall 29 of apex portion 17. Cylindrical support member 62 disposed projecting downwardly from the bottom 36 of the apex portion 17 of the hopper 10 is attached thereto as by welding. A support bracket, indicated generally by the numeral 64, comprising a central rectangular bar portion 66 having a cylindrical sleeve end portion 70 and an extending planar end portion 72 is slideably and rotatably mounted on the cylindrical support member 62 by sliding thereon the cylindrical sleeve end portion 70 and is held in a desired position by setscrews 74. The planar end portion 72 of the support bracket 66 is adapted to support the second hydraulic motor 21 having an upwardly extending motor shaft 76. Hydraulic motor 21 is held in a vertical position as by bolting to the planar end portion 72 of the support bracket 64, the motor shaft 76 extending through an opening provided in the planar end portion 72. The spinner-spreader 20 is attached to the upper end of the motor shaft 76 by a collar and set screw assembly 78 attached as by welding to the underside 80 of the spinner-spreader. The spinner-spreader 20 comprises a circular steel plate 82 having mounted thereon vanes 84 extending radially from about the center 86 of the said steel plate to the outer edge 88 thereof. A preferred form of vane as shown is one sloping downwardly so as to have the shortest vertical dimension at the edge of the steel plate.

In FIGS. 1 and 4, there are illustrated the relative spatial relationships of the various parts of the support assembly 23 of the power deriving means 22. The support assembly 23 includes an inverted U-shaped bracket 90 attached to the chassis frame member 12 and a double, generally L-shaped bracket 92 depending from bracket 90. Bracket 90 comprises an inverted U-shaped member having parallel sides 96 connected by an end portion 98. The bracket 90 is attached to the side of chassis frame member 12, as by welding one of the sides 96 thereto, at a point adjacent the rear trailer wheel 15, the end portion 98 of the bracket extending normal to the frame member. To better illustrate the form of the bracket 90 and the chassis frame member 12 in FIG. 4, the bracket 90 is shown in full and the complete cross section of frame member 12 as well although these are shown only in a fragmentary manner in FIG. 1. The double, generally L-shaped bracket 92, having sides 99 and 99a and upper and lower cross-support members 100, 102 and downwardly projecting portions 104 and 106 extending normal to the base portions 108 of the generally L-shaped sides, is pivotally suspended from the bracket 90 by a pin 110. The pin 110 extends through the upper end portions 112 of the sides 99, 99a of the L-shaped bracket 92 and through the sides 96 of support bracket 90 and is welded to the sides of the support bracket or otherwise retained. Lateral motion of the L-shaped bracket 92 on the pin 110 is restricted by collar and setscrew assemblies 113. A linking member 114 having a turnbuckle portion 116 is attached to the flange assembly 30, as by means of projecting support member 118 and to one side 99 of the L-shaped bracket 92 providing support for the bracket and limiting the pivotal motion thereof. Adjustment of the turnbuckle portion 116 permits changing the angle of dependence of the L-shaped bracket 92. The linking member 114 could, if desired, be constructed with a U-shaped end portion adapted to be connected to both sides of L-shaped bracket 92.

In FIGS. 1, 3, 4 and 6, the pivotal bracket 94 of the power deriving means support assembly 23 is shown supported by the L-shaped bracket 92. The generally horizontally disposed double T-shaped bracket 94 having vertical sides 120 and 122, cross-support members 124 and 126 at the ends of the upper and lower arm portions 128, 130, respectively, and a cross-support member 132 at the ends 133 of the leg portions 134 of the T is pivotally supported from the L-shaped bracket 92 by a pin 136 which extends transversely through the sides 120 and 122 of the T-shaped bracket 94 about midway between the ends of the arm portions 128 and 130, and through the sides 99 and 99a of the L-shaped bracket 92 adjacent the ends 140 of the base portions 108. Referring more particularly to FIGS. 4 and 6, the sides 120 and 122 of the T-shaped bracket 94 are shown spaced further apart than the sides 99 and 99a of the L-shaped bracket 92. The T-shaped bracket 94 is disposed so as to generally surround the base portions 108 of the L-shaped bracket 92, the length of the leg portions 134 of the T-shaped bracket 94 being somewhat longer than the said base portions 108 so as to permit some pivotal motion of the T-shaped bracket 94 about the pin 136 without the cross-support member 132, moving arcuately, striking the L-shaped bracket 92. Pin 136, as shown, is in the form of a bolt having a nut 137 threaded thereon as retaining means.

The power deriving means 22 includes, in addition to the support assembly 23 and pivotal T-shaped bracket 94, two rubber-tired wheels 142 and 144 adapted to frictionally engage the tire 16 of the wheel 15 of the vehicle, axial shafts 146 and 148 on which the rubber-tired wheels are mounted, mechanical power transmitting means 150 connecting the axial shafts 146 and 148, a hydraulic pump 152 adapted to be driven by one of the said axial shafts and an oil reservoir 154 for the hydraulic pump 152.

In FIGS. 1, 3, and 6, it may be seen that the two rubber-tired wheels 142 and 144, conveniently of about 12 inches total diameter, are disposed between the sides of the upper and lower arm portions 128, 130, respectively, of the T-shaped bracket 94 and mounted on and affixed to axial shafts 146 and 148, respectively. The shaft 146 extends through the side 120 and is suitably journalled in bearings 156 affixed to the sides 120 and 122 of the T-shaped bracket 94. A drive wheel 158 in the form of a sprocket wheel is mounted on and affixed to the end portion 160 of the shaft 146 extending outwardly from the T-shaped bracket 94. Shaft 148 extends through both sides 120 and 122 of bracket 94 and is journalled in suitable bearings 162. While the bearings 156 and 162 are illustrated for simplicity as flat bearings, ball bearings are to be understood as generally to be preferred. A drive wheel 164 in the form of sprocket wheel is mounted on and affixed to the end portion 166 of the shaft 148 and connected to the drive wheel 158 by mechanical power transmitting means 150 in the form of a sprocket chain. The end portion 167 of the shaft 148 is coupled in abutting relationship to the axially aligned shaft 168 of the hydraulic pump 152. As shown, the shafts 148 and 168 are rigidly coupled by a sleeve member 170 and set screws 172, though a flexible type coupling, such as a universal joint, may also be used. A hydraulic pump 152 which is of the positive action type, such as a gear pump, is to be preferred. A bracket 174, attached to the side of the T-shaped bracket 94, serves as a base or support bracket for hydraulic pump 152 which is mounted thereon. The oil reservoir 154 for the pump 152 comprises, as shown in FIG. 3, a hollow rectangular container constructed integrally with bracket 94 and having a common side 122 therewith, though integral construction is not essential. If desired, a suitable filter 176 may be disposed within the reservoir suspended from and in communication with the inlet line 178 at the top 180 of the reservoir to remove insoluble particulate matter from oil entering the reservoir. A pipe T 182 connecting the flexible hydraulic hose 184 to the inlet line 178 is provided with a plug 185 which can be removed in order to make additions of oil to the reservoir. Standard pipe fittings comprising two elbows 186, 187, a nipple 188, and a union 189 provide for the flow of oil from the lower part 190 of reservoir 154 to the inlet side 192 of hydraulic pump 152. Communication between the outlet or high pressure side 194 of the hydraulic pump 152 and the inlet side 196 of the hydraulic motor 19 is provided by two standard pipe elbows 198, 199 and a length of flexible hydraulic hose 200 connected sequentially, as shown. The hydraulic hose 200 should be of sufficient length so as not to interfere with the pivotal movement of the T-shaped bracket 94. The outlet side 202 of the hydraulic motor 19 is connected by a pipe nipple 204 and standard pipe fittings 205 to the inlet side 206 of an adjustable flow regulator 208 which permits a constant predetermined rate of flow of hydraulic oil or fluid to hydraulic motor 21. The regulator 208 is of a standard design. The flow of hydraulic oil which issues from the higher pressure outlet side 210 of the flow regulator 208 during use of the invention is adjusted by turning the control knob 212. Standard pipe fittings 214, 215 and a length of hydraulic hose 216 connected in series, as shown, provide communication of the high pressure outlet side 210 of the flow regulator 208 with the inlet side 218 of hydraulic motor 21. A standard pipe fitting 220, a length of flexible hydraulic hose 222, a pipe T 224 and another length of flexible hydraulic hose 184 connected in series serves as a return line from the outlet side 226 of the hydraulic motor 21 to the pipe T 182 at the top of the oil reservoir 154. The low pressure outlet side 228 of flow regulator 208 is connected to the return line at the pipe T 224 by means of a pipe elbow 230 and two pipe nipples 232, 233 connected in series as shown. Flow regulator 208 may be one having a relief valve built in to control the flow of hydraulic fluid from the outlet 228 or, if desired, a relief valve 229 may be provided in series with the outlet side 228 of the flow regulator and the connection to the return line to the reservoir as shown in FIG. 8.

As stated hereinabove the control means for the power deriving means 22 includes a double-acting air cylinder 24 and coil springs 25, 26 which oppose the action of the air cylinder. The relationship of the air cylinder 24 and the coil springs 25, 26 to L-shaped bracket 92 and T-shaped bracket 94 and associated linking members is shown in FIGS. 1, 4, and 6. A suitable air cylinder is one of the type commercially available having a 3 inch stroke from center or a total maximum piston travel of 6 inches. The air cylinder 24 is suspended from a pin 234 by means of a U-shaped connecting member 236 having parallel side portions 238 and an end portion 240. The end portion 240 is attached to the upper end 242 of the air cylinder. The pin 234, in the form of a bolt, extends laterally through the sides 99, 99a of the bracket 92 and through the side portions 238 of connecting member 236 disposed therebetween. The pin 234 is provided with suitable retaining means such as a nut 243. A collar and setscrew assembly 244, slideably mounted on the pin 234 and disposed between the side portions 238 of the connecting member 236 permits lateral adjustment of the position of the air cylinder 24. A rod 246 provided with an end extension 248 serves as a linking member between the piston, not shown, within the air cylinder 24 and two parallel extensions 250 which project laterally from the cross-support member 132 of the T-shaped bracket 94 about midway between the sides 120 and 122 of the bracket, and extend in the direction of the pin 136 on which the T-shaped bracket pivots. The end extension 248 of rod 246 is disposed between the parallel extensions 250 and pivotally connected thereto by a pin 252 in the form of a bolt which extends through the extensions 248 and 250 and is suitably retained as by a nut 254.

The action of air cylinder 24 is controlled by suitable valving means 256 such as a 4-way control valve (shown symbolically in FIG. 1) which is preferably mounted in or about the truck or trailer tractor and adapted to be operated from the operator's cab. Air pressure is drawn from the usual truck or tractor compressed air supply (not shown). Compressed air is supplied to and exhausted from the air cylinder 24 via pneumatic lines or hoses 258, 260 connecting the 4-way control valve 256 to the upper and lower ends 262, 264, respectively, of the air cylinder.

Referring now to FIGS. 1, 4, and 6 it may be seen that the leg ends 133 of the T-shaped bracket 94 are resiliently supported by the upper coil spring 25 which is attached by means of a linking member 266 to the upper cross-support member 100 of the L-shaped bracket 92 and to the cross-support member 132 of the said T-shaped bracket 94 by means of a linking member 268. The linking member 268 connects the coil spring to the side extension 270 projecting laterally from cross-support member 132. The leg ends 133 of the T-shaped bracket 94 are also resiliently connected to the lower cross-support member 102 of the L-shaped bracket 92 by the lower coil spring 26 and linking members 272 and 274. The coil spring 26 is attached to the cross-support member 102 by means of the linking member 272 and to the side extension 270 of the cross-support member 132 by means of the linking member 274. Linking members 268 and 274 are substantially identically shaped. The linking member 274 as shown more fully in FIG. 5 has one end 276 in the form of a hook or loop as desired. The linking members 268 and 274 are pivotally attached to side extension 270 by a pin 278 which extends through the side extension 270 and the respective hooks of linking members 268 and 274 at either side thereof. As shown in FIG. 6 the pin 278 is provided with retaining means in the form of upset ends 280 though other means may be used.

The relationship of the coil spring 26 and the linking members 272 and 274 is more clearly understood with reference to FIG. 5 in which the parts are shown slightly enlarged. The lower end portion 282 of the coil spring 26 is formed into a smaller diameter spiral than the main part of the spring. The shank 284 of the linking member 272 is of such a diameter as to be freely slideable through the lower end portion 282 but is retained within the coil spring by an enlarged end or head 286 formed at one end 287 of the shank 284. The enlarged end portion 290 of the linking member 274 may be similarly loosely retained within the smaller upper end 288 of the coil spring 26. However, it is to be preferred that the upper end 288 of the coil spring 26 is not slideable upon the shank 292 of the linking member 274 but the spring is welded to the said shank and/or the enlarged end 290 thereof. The upper coil spring 25 is connected to corresponding linking members 266, 268 in a manner similar to that described for the lower coil spring, linking member 266 having the same form as linking member 272 and being similarly attached and linking member 268 having the same form as linking member 274 and a similar function.

In FIG. 7 there is shown a fragmentary view of a lateral side portion of the apex portion 17 of hopper 10 having mounted therein a different form of a screw feed device, indicated generally by the numeral 298, adapted for use in an embodiment of the invention by means of which granular material is metered and spread from either or both lateral sides of the hopper. It is to be understood that the opposite lateral end portion of the hopper and the screw feed device mounted therein is identical to the end portion shown in a fragmentary view in FIG. 2. As shown, the screw feed device 298 has spiral flight portions 300, 302 which are opposite in pitch, the pitch of each being adapted to move granular material to gate openings adjacent the lateral sides of the hopper, for example, spiral flight portion 300, when actuated, moves granular material to gate opening 304 adjacent lateral side 306. As generally employed, the spiral flight portions 300 and 302 are of equal length so as to move about half the contents of the hopper to each gate opening. The spiral flight portions 300 and 302 are mounted on a common axial shaft 308 which is driven from one end by hydraulic drive means similar to that employed for the screw feed device shown in FIG. 2. Mounted below the gate opening 304 is a vaned spreader 310 which is provided with a hydraulic motor 312 and with supportive means indicated generally by the numeral 314 which are similar respectively to vaned spreader 20, hydraulic motor 21 and the supportive means therefor.

Figure 10:
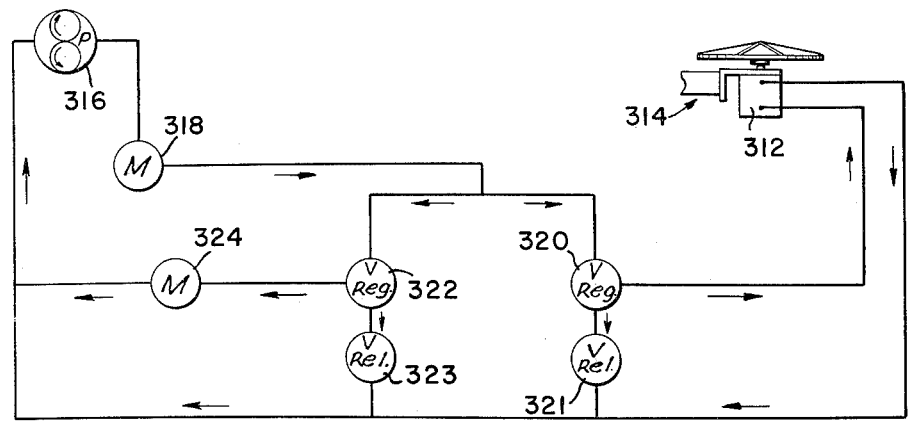
FIG. 10 is a substantially schematic representation of a hydraulic system similar to that shown in FIG. 7, but having separate relief valves for each of two flow regulators.

As shown schematically in FIG. 7 in the sequential arrangement of the parts of the hydraulic system of the foregoing embodiment, including the hydraulic motor 312, it is seen that the hydraulic pump 316 is connected by hydraulic fluid transmitting means to a hydraulic motor 318. It is to be understood that the hydraulic motor 318 provides actuating power adapted to be used in operating the screw feed device 298. The effluent side of the hydraulic motor 318 is in turn connected to two adjustable hydraulic flow controllers 320, 322 arranged "in parallel" with respect to fluid flow. The flow controller 320 is adapted to permit a preselected constant flow of hydraulic fluid to the hydraulic motor 312 via hydraulic fluid transmitting means. The flow controller 322 is adapted to permit a preselected constant flow of hydraulic fluid via hydraulic fluid transmitting means to a hydraulic motor 324 which is adapted to actuate the vaned spreading means (not shown) employed at the side of the hopper 10 opposite gate opening 304. It is to be further understood that flow regulators 320, 322 are each provided with a built-in relief valve, though separate relief valves may be used, if desired, as illustrated in FIG. 10, to permit the by-pass flow of hydraulic fluid when necessary for the operation of hydraulic motor 318. In FIG. 10, in which a hydraulic system similar to that shown in FIG. 7 is represented schematically, a relief valve 321 is shown in series with the flow regulator 320 and the return line, while a second relief valve 323 is shown in series with the other flow regulator 322 and the return line. Referring again to FIG. 7, additional hydraulic fluid transmitting means is provided for the return of hydraulic fluid from the effluent sides of the hydraulic motors 312 and 324 as well as from the by-pass sides of the flow controllers to the hydraulic pump 316.

In spreading granular material from a wheeled vehicular container using the apparatus of the invention, for example, in using the apparatus as mounted on a truck trailer as shown in FIG. 1, the sliding gate 35 to the gate opening 34 is moved to the open position and flow regulator 208 is adjusted so that hydraulic motor 21 will drive the vaned spreading means 20 at a suitable speed so as to cover a desired width of a surface when spreading the granular material.

When it is desired to begin spreading the granular material four-way valve 256 is turned to one of the two operating positions so that air pressure is supplied to air cylinder 24. For example, if air pressure is supplied to the upper end 262 of the air cylinder the piston therein moves the rod 246 downwardly thus thrusting the leg end 133 of the T-shaped bracket 94 also downwardly against the action of the coil spring 25 and causing the said T-shaped bracket to pivot about pin 136 thereby bringing the periphery of the rubber-tired wheel 144 into firm contact with trailer tire 16. If the trailer is in motion, or upon putting the trailer in motion, the rubber-tired wheel 144 is made to rotate by trailer tire 16 and thus supply power to hydraulic pump 152.

If slippage should occur between the trailer tire and rubber-tired wheel 144 the contact pressure therebetween may be regulated as by adjusting turnbuckle 116 of linking member 114 connecting L-shaped bracket 92 and the hopper 10, thus changing the angle of dependence of the L-shaped bracket and varying the distance or spacing between the support assembly 23 and the trailer tire 16. On adjusting the said spacing the pressure which may be effectively brought to bear on the rubber-tired wheel-trailer tire combination by air cylinder 24 is regulated.

As T-shaped bracket 94 is pivoted into the operating position as shown in FIG. 1 air cylinder 24 works against the coil spring 25, distending the spring while the coil spring 26 in a preferred embodiment is not compressed but simply slides down over the shank of linking member 272. Using the apparatus as shown, air pressure must be continuously supplied to air cylinder 24 to keep the T-shaped bracket 94 in operating position and the rubber-tired wheel 144 in frictional engagement with the trailer tire 16. Upon venting the air pressure from air cylinder 24, coil spring 25 is permitted to contract and raise the leg end 133 of the T-shaped bracket and bring the rubber-tired wheel 144 out of frictional engagement with the trailer tire 16. Coil spring 26 is adapted to serve similarly to bring the rubber-tired wheel 142 out of frictional engagement with the trailer tire when the power pick-up means is in the other operating position.

Thus upon bringing one of the rubber-tired wheels 142, 144 into frictional engagement with the trailer tire the hydraulic pump 152 is driven and hydraulic pressure is generated. Hydraulic pressure generated by the hydraulic pump 152 causes hydraulic fluid to flow through the hoses or lines as indicated by the arrows thereon and hydraulic motor 19 is driven by the fluid flow at a speed proportional to the speed of the trailer. Hydraulic motor 19 in turn actuates the screw conveyor 18 the rotational speed of the screw conveyor being proportional to the rotational speed of the hydraulic motor. The screw conveyor 18 then delivers to the vaned spreading means 20 an amount of granular material proportional to the speed of the trailer, the screw conveyor serving as a metering device.

Concurrently hydraulic fluid flowing from the outlet side 202 of the hydraulic motor 19 enters the flow regulator 208 from whence a regulated constant flow of hydraulic fluid is directed to hydraulic motor 21 which rotates and drives vaned spreading means 20 at a constant speed. The balance of the flow of hydraulic fluid entering the flow regulator 208 is by-passed through a relief valve, such as valve 229 as shown in FIG. 8, to the return line where it joins hydraulic fluid from the exit side 226 of the hydraulic motor 21 and is returned to the reservoir 154.

To keep the vaned spreading means 20 rotating at a given constant speed at least a minimum amount of hydraulic pressure must, of course, be generated by the hydraulic pump 152, the minimum amount being determined by the nature of the pump and motor of the apparatus and the rotational speed selected for hydraulic motor 21.

The hydraulic pressure generated by the hydraulic pump 152 is controlled or regulated by the trailer speed as well as by the selection of the operating position of the power pick-up means 22. In the two alternate operating positions of the power pick-up means as shown in FIG. 1 the ratio of the rotational speed of the hydraulic pump 152 to the linear speed of the trailer differs according to the circumference of the respective sprocket wheels 158 and 164. Thus as shown in the drawing a greater level of hydraulic power is generated by pump 152 when rubber-tired wheel 144 is driven by the trailer tire 16 than when rubber-tired wheel 142 is so driven. Thus the trailer operator may at his discretion select one of two rates of spreading the granular material without affecting simultaneously the width or distance the material is spread. This is quite an advantage in that the operator can spread the granular material at a heavier rate on hilly streets or highways and at especially icy or critical stops and intersections and at a lighter rate or even not at all on level areas or dry pavement, thus conserving the granular material. This can be done without stopping the trailer and interfering with auto traffic.

The modification of the apparatus having a screw feed device and dual spreading means as indicated in FIG. 7 is advantageously employed in spreading granular material across an especially wide strip of a surface, the operation of the apparatus being substantially as described hereinabove except for the screw conveyor 298 metering the granular material to both sides of the vehicular container instead of to just one side, and the use of an additional spreading means. The apparatus in this form may also be used in spreading granular material exclusively from either side of the wheeled vehicular container as desired upon closing the appropriate gate opening or upon adjusting the appropriate flow regulator to zero flow, although the apparatus as shown is not adapted to permit the operator to accomplish this from the trailer truck cab.

Figure 9:
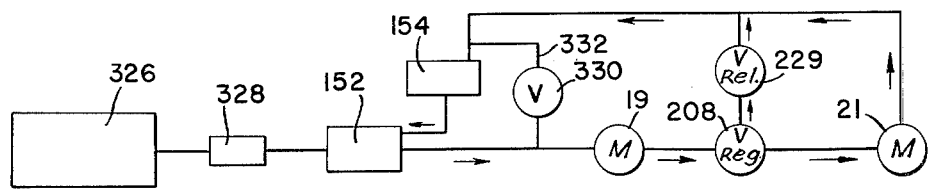
FIG. 9 is a schematic representation of a hydraulic system and associated power supply, hydraulic pump and hydraulic motors in an embodiment of the invention in which hydraulic power is derived more directly from the engine that provides motive power for the wheeled vehicle from which granular material is being spread.

If desired, in another modification of the apparatus of the invention, the hydraulic power therefor may be derived from the power takeoff of the engine propelling the wheeled vehicular container from which granular material is being spread, instead of from a wheel of the said vehicle using the power pick-up means described hereinabove. In this form of the invention, a hydraulic pump similar to hydraulic pump 152 of FIG. 3 is adapted rather simply as by direct axial drive to be driven by the conventional power takeoff and somewhat longer hydraulic lines are employed to transmit the hydraulic fluid, as previously described, to and from the hydraulic motors which actuate the screw feed device and the vaned spreading means. Power so derived from the power takeoff is available at many power levels each proportional to the speed of the vehicle as the truck or trailer tractor is operated at different transmission gear ratios. The power supply and hydraulic system of this form of the invention are represented schematically in FIG. 9. As shown in FIG. 9, the engine 326 is connected by power coupling means 328, such as a conventional power takeoff, to a hydraulic pump 152. The hydraulic pump 152 is connected to the rest of the hydraulic system by suitable hydraulic lines and connections. The operation of the pump 152 is controllable from the cab of the truck tractor (not shown) as by controls for the power coupling means 328, such as conventional controls for a power takeoff, or, if desired, by the opening and closing of the valve 330 in the bypass line 332 which connects the outlet line from the hydraulic pump 152 to the return line to the fluid reservoir 154. Bypass line 332 conveniently extends into the truck tractor cab in such a manner that the section in which valve 330 is located is within easy reach of the operator. This modification of the apparatus has the additional advantages that granular material may be spread while the vehicle is motionless, and there is little or no lag after putting the vehicle in motion before the hydraulic pressure is built up to the minimum level at which the hydraulic motor for the vaned spreading means assumes a constant speed.

Having thus described my invention, it will be understood that certain obvious modifications are intended to be included, limited only by the scope of the hereinafter appended claims.

I claim:

1. Apparatus for distributing granular material from a wheeled vehicle over a predetermined width of a surface comprising a wheeled vehicular container for said granular material, metering apparatus mounted on said wheeled vehicle and adapted to controllably discharge granular material from said wheeled vehicular container, hydraulic actuating means for the metering apparatus operatively engaged therewith, vaned rotating spreading means mounted on said wheeled vehicle and adapted to spread granular material being discharged from said wheeled vehicular container, constant speed hydraulic actuating means, including a hydraulic motor and a suitable flow control device, operatively engaged with said spreading means said flow control device being adapted to permit a preselected constant rate of flow of hydraulic fluid to the said hydraulic motor, means including a hydraulic pump coupled to said wheeled vehicle for deriving hydraulic power from the wheeled vehicle, and means for transmitting the derived hydraulic power sequentially to the hydraulic actuating means for the metering apparatus and thence via the flow control device to the hydraulic actuating means for the spreading means.

2. Apparatus as in claim 1 in which the means for deriving hydraulic power is adapted to derive power from a wheel of the wheeled vehicle.

3. Apparatus as in claim 1 in which the means for deriving hydraulic power is adapted to derive power from the engine of the wheeled vehicle.

4. Apparatus as in claim 1 in which the metering apparatus is a screw feed device.

5. Apparatus for distributing granular material from a wheeled vehicle over a predetermined width of a surface and at a rate proportional to the speed of the wheeled vehicle comprising a wheeled vehicular container for said granular material, said wheeled vehicular container being propelled by an internal combustion engine, metering apparatus disposed within said wheeled vehicular container and adapted to controllably discharge granular material therefrom, hydraulic actuating means for the metering apparatus operatively engaged therewith, vaned rotating spreading means mounted on said wheeled vehicular container below the container and adapted to spread granular material discharged therefrom, constant speed hydraulic actuating means, including a hydraulic motor and a suitable flow control device, operatively engaged with said spreading means, said flow control device being adapted to permit a preselected constant rate of flow of hydraulic fluid to the said hydraulic motor, means, including a hydraulic pump mounted on said wheeled vehicle, for deriving hydraulic power from the said internal combustion engine, said hydraulic power being proportional to the speed of the wheeled vehicle when the wheeled vehicle is in motion, and means for transmitting the derived hydraulic power sequentially to the hydraulic actuating means for the metering apparatus and thence via the flow control device to the hydraulic actuating means for the spreading means.

6. Apparatus for distributing granular material from a wheeled vehicle over a predetermined width of a surface and at a rate proportional to the speed of the wheeled vehicle comprising a wheeled vehicular container for said granular material, said wheeled vehicular container having a gate opening in the bottom portion thereof, metering apparatus disposed within said wheeled vehicular container and adapted to controllably discharge granular material through said gate opening, hydraulic actuating means for the metering apparatus operatively engaged therewith, vaned rotating spreading means mounted below the said gate opening and adapted to spread granular material being discharged therefrom, constant speed hydraulic actuating means, including a hydraulic motor and a suitable flow control device, operatively engaged with said spreading means, said flow control device being adapted to permit a preselected constant rate of flow of hydraulic fluid to the said hydraulic motor, means, including a hydraulic pump, for deriving hydraulic power from a wheel of the wheeled vehicle, said derived hydraulic power being proportional to the speed of the wheeled vehicle, and means for transmitting the derived hydraulic power sequentially to the hydraulic actuating means for the metering apparatus and thence via the flow control device to the hydraulic actuating means for the spreading means.

7. Apparatus for distributing granular material from a wheeled vehicle over a predetermined width of a surface and at a rate proportional to the speed of the wheeled vehicle, comprising a wheeled vehicular container for said granular material, said wheeled vehicular container having a gate opening in the bottom portion thereof, metering apparatus disposed within said wheeled vehicular container and adapted to controllably discharge granular material through said gate opening, hydraulic actuating means for the metering apparatus operatively engaged therewith, vaned rotating spreading means mounted below said gate opening and adapted to spread granular material discharged therefrom, constant speed hydraulic actuating means, including a hydraulic motor and a suitable flow control device, operatively engaged with said spreading means, said flow control device being adapted to permit a preselected constant rate of flow of hydraulic fluid to the said hydraulic motor, means for deriving hydraulic power from a wheel of the wheeled vehicle, said means for deriving hydraulic power being mounted on the wheeled vehicle and including a hydraulic pump, at least one wheel adapted to be driven by frictional engagement with said wheel of the wheeled vehicle, and mechanical power transmitting means connecting said driven wheel and said hydraulic pump, said means for deriving hydraulic power being movable into and out of operative engagement with said wheel of the wheeled vehicle, control means for moving said means for deriving hydraulic power into and out of operative engagement with said wheel of the wheeled vehicle, said derived hydraulic power being proportional to the speed of the wheeled vehicle, and means for transmitting the derived hydraulic power sequentially to the hydraulic actuating means for the metering apparatus and thence via the flow control device to the hydraulic actuating means for the spreading means.

8. Apparatus for distributing granular material from a wheeled vehicle over a predetermined width of a surface and at a rate proportional to the speed of the wheeled vehicle comprising a wheeled vehicular container for said granular material, metering apparatus mounted on said wheeled vehicle and adapted to controllably discharge granular material from the wheeled vehicular container, said metering apparatus comprising a screw feed device having right and left hand screw feed portions and a gate opening at the delivery end of both feed portions, hydraulic actuating means for the metering apparatus operatively engaged therewith, mounted below each gate opening vaned rotating spreading means adapted to spread granular material discharged from the gate openings, operatively engaged with each said spreading means respective constant speed hydraulic actuating means, each said hydraulic actuating means including a hydraulic motor and a suitable flow control device, means for including a hydraulic pump coupled to said wheeled vehicle for deriving hydraulic power from the wheeled vehicle, said hydraulic power being proportional to the speed of the wheeled vehicle, and means for transmitting the derived hydraulic power sequentially to the hydraulic actuating means for the metering apparatus and thence in parallel via the respective separate flow control devices to each said hydraulic actuating means for each said spreading means.

9. In combination with a wheeled vehicle, means for deriving hydraulic power from a wheel of the wheeled vehicle and control means for said means for deriving hydraulic power comprising support means depending from said wheeled vehicle adjacent a wheel of the wheeled vehicle, said support means having an upper portion, a lower portion and a midportion, a pivotal bracket mounted pivotally on said support means at the said midportion, two rubber-tired wheels, each having a substantially smaller diameter than the wheels of the wheeled vehicle, secured to substantially parallel axial shafts rotatably mounted on said pivotal bracket, said rubber-tired wheels being disposed in a coplanar position relative to the said adjacent wheel, rotatable drive means mounted on each of said axial shafts, each said rotatable drive member being of different diameter and aligned in coplanar relation, flexible power transmitting means connecting both of said rotatable drive means, mechanical coupling means connecting an end portion of one of said axial shafts to a hydraulic pump axially aligned therewith, double-acting air cylinder means, including a piston element, mounted on said support means, said piston element being connected by a linking member to said pivotal bracket at a point removed from the axis about which the bracket pivots, said double-acting air cylinder means being remotely controllable and adapted to pivot said pivotal bracket so as to bring, from time to time, and alternatively, one of said rubber-tired wheels into frictional engagement with the periphery of said adjacent wheel of the wheeled vehicle, first coil spring means resiliently connecting the upper portion of said support means and said pivotal bracket and being adapted to oppose downward motion of the piston element of said double-acting air cylinder means, second coil spring means resiliently connecting the lower portion of said support means and said pivotal bracket and being adapted to oppose upward motion of the piston element of said double-acting air cylinder means, and both of said coil spring means being respectively adapted to resiliently urge said pivotal bracket to pivot to a neutral position in which neither coil spring means is substantially distended nor compressed whereby neither of said rubber-tired wheels is in frictional engagement with said adjacent wheel of the wheeled vehicle when air pressure is released from said double-acting air cylinder means.

10. Apparatus for spreading granular material comprising, in combination with a wheeled vehicle propelled by an internal combustion engine and having a longitudinally disposed frame and a V-bottom hopper mounted thereon, said V-bottom hopper having a bottom portion, sloping sidewalls and vertical endwalls, a screw conveyor disposed along the bottom portion of the hopper, said screw conveyor having an axial shaft journalled in the vertical endwalls of the V-bottom hopper, said axial shaft extending therethrough one of the endwalls, a first sprocket wheel mounted on said extending axial shaft outside the V-bottom hopper, a first hydraulic motor attached to a sloping sidewall of the V-bottom hopper and adapted to drive the screw conveyor by flexible power transmitting means, a gate opening in the bottom portion of said V-bottom hopper at the delivery end of said screw conveyor, a second hydraulic motor mounted in vertical position below the said gate opening, said second hydraulic motor having an upwardly extending shaft, a vaned spreader mounted on the upwardly extending shaft, a hydraulic pump mounted on said vehicle and connected to the said engine by power coupling means, said hydraulic pump having a hydraulic fluid reservoir therefor connected thereto by an inlet line and said hydraulic pump having an outlet, tubular means for conveying a flow of hydraulic fluid from the outlet of said hydraulic pump to the first hydraulic motor, other tubular means adapted for conveying a flow of hydraulic fluid from the first hydraulic motor to a constant flow controller, said constant flow controller being adapted to permit a preselected constant rate of flow of hydraulic fluid to the second hydraulic motor and having an inlet, a first regulated outlet and a bypass outlet, said bypass outlet being regulated by a relief valve, additional tubular means adapted for conveying a flow of hydraulic fluid from the first regulated outlet of said constant flow controller to said second hydraulic motor, additional tubular means adapted for conveying a flow of hydraulic fluid from the said second hydraulic motor and from the said bypass outlet of the constant flow controller to the said hydraulic fluid reservoir.

11. Apparatus for distributing granular material from a wheeled vehicle over a predetermined width of a surface and at a rate proportional to the speed of the wheeled vehicle, comprising a wheeled vehicular container for said granular material, said wheeled vehicular container having a gate opening in the bottom portion thereof, metering apparatus disposed within said wheeled vehicular container and adapted to controllably discharge granular material through said gate opening, hydraulic actuating means for the metering apparatus operatively engaged therewith, vaned rotating spreading means mounted below said gate opening and adapted to spread granular material discharged therefrom, constant speed hydraulic actuating means, including a hydraulic motor and a suitable flow control device, operatively engaged with said spreading means, means for deriving hydraulic power from a wheel of the wheeled vehicle, said means for deriving hydraulic power being mounted on the wheeled vehicle and including a hydraulic pump, at least one wheel adapted to be driven by frictional engagement with said wheel of the wheeled vehicle, and mechanical power transmitting means connecting said driven wheel and said hydraulic pump, said means for deriving hydraulic power being movable into and out of operative engagement with said wheel of the wheeled vehicle, control means for moving said means for deriving hydraulic power into and out of operative engagement with said wheel of the wheeled vehicle, said control means comprising air cylinder means and opposing spring means mounted on said wheeled vehicle, said air cylinder means being mechanically connected to said means for deriving hydraulic power and adapted to move into and maintain said means for deriving hydraulic power in operative engagement with said wheel of the wheeled vehicle, and said opposing spring means being mechanically connected to said means for deriving hydraulic power and adapted to urge said means for deriving hydraulic power out of operative engagement with said wheel of the wheeled vehicle, said derived hydraulic power being proportional to the speed of the wheeled vehicle, and means for transmitting the derived hydraulic power sequentially to the hydraulic actuating means for the metering apparatus and thence via the flow control device to the hydraulic actuating means for the spreading means.

12. Apparatus for distributing granular material from a wheeled vehicle over a predetermined width of a surface and at a rate proportional to the speed of the wheeled vehicle, comprising a wheeled vehicular container for said granular material, said wheeled vehicular container having a gate opening in the bottom portion thereof, metering apparatus disposed within said wheeled vehicular container and adapted to controllably discharge granular material through said gate opening, hydraulic actuating means for the metering apparatus operatively engaged therewith, vaned rotating spreading means mounted below said gate opening and adapted to spread granular material discharged therefrom, constant speed hydraulic actuating means, including a hydraulic motor and a suitable flow control device, operatively engaged with said spreading means, means for deriving hydraulic power from a wheel of the wheeled vehicle and control means therefor comprising support means depending from said wheeled vehicle adjacent a wheel of the wheeled vehicle, said support means having an upper portion, a lower portion and a midportion, a pivotal bracket mounted pivotally on said support means at the said midportion, two rubber-tired wheels, each having a substantially smaller diameter than the wheels of the wheeled vehicle, secured to substantially parallel axial shafts rotatably mounted on said pivotal bracket, said rubber-tired wheels being disposed in a coplanar position relative to the said adjacent wheel of the wheeled vehicle, rotatable drive means mounted on both said axial shafts, each said rotatable drive means being of different diameter and aligned in coplanar relation, flexible power transmitting means connecting both of said rotatable drive means, coupling means connecting an end portion of one of said axial shafts to a hydraulic pump axially aligned therewith, double-acting air cylinder means including a piston element mounted on said support means, said piston element being connected by a linking member to said pivotal bracket at a point removed from the axis about which the bracket pivots, said double-acting air cylinder means being remotely controllable and adapted to pivot said pivotal bracket so as to bring, from time to time, and alternatively, one of said rubber-tired wheels into frictional engagement with the periphery of said adjacent wheel of the wheeled vehicle, first coil spring means resiliently connecting the upper portion of said support means and said pivotal bracket and being adapted to oppose downward motion of the piston element of said double-acting air cylinder means, second coil spring means resiliently connecting the lower portion of said support means and said pivotal bracket and being adapted to oppose upward motion of the piston element of said double-acting air cylinder means, and both said coil spring means being respectively adapted to resiliently urge said pivotal bracket to pivot to a neutral position in which neither coil spring means is distended nor compressed and neither of said rubber-tired wheels is in frictional engagement with said adjacent wheel of the wheeled vehicle when air pressure is released from said double-acting air cylinder means, said derived hydraulic power being proportional to the speed of the wheeled vehicle, and means for transmitting the derived hydraulic power sequentially to the hydraulic actuating means for the metering apparatus and thence via the flow control device to the hydraulic actuating means for the spreading means.

13. The apparatus as in claim 12 having an adjustable linking member interconnecting said support means, depending from said wheeled vehicle, with a remote portion of said wheeled vehicle whereby the angle of dependence may be adjusted.

References Cited in the file of this patent

UNITED STATES PATENTS

| | | |
|---|---|---|
| 1,751,531 | Schars | Mar. 25, 1930 |
| 2,190,863 | Dance | Feb. 20, 1940 |
| 2,281,212 | Stoltzfus | Apr. 28, 1942 |
| 2,697,609 | Chase | Dec. 21, 1954 |
| 2,799,510 | Schmidt | July 16, 1957 |
| 2,946,597 | Simonsen | July 26, 1960 |

FOREIGN PATENTS

| | | |
|---|---|---|
| 491,140 | Canada | Mar. 10, 1953 |